W. W. ALLEN.
TRACK BRAKE.
APPLICATION FILED DEC. 5, 1908.

924,720.

Patented June 15, 1909.
2 SHEETS—SHEET 1.

Witnesses
W. R. Edelin
Geo. Wedderburn

Inventor
W. W. Allen
By Alex J. Wedderburn Jr.
Attorney

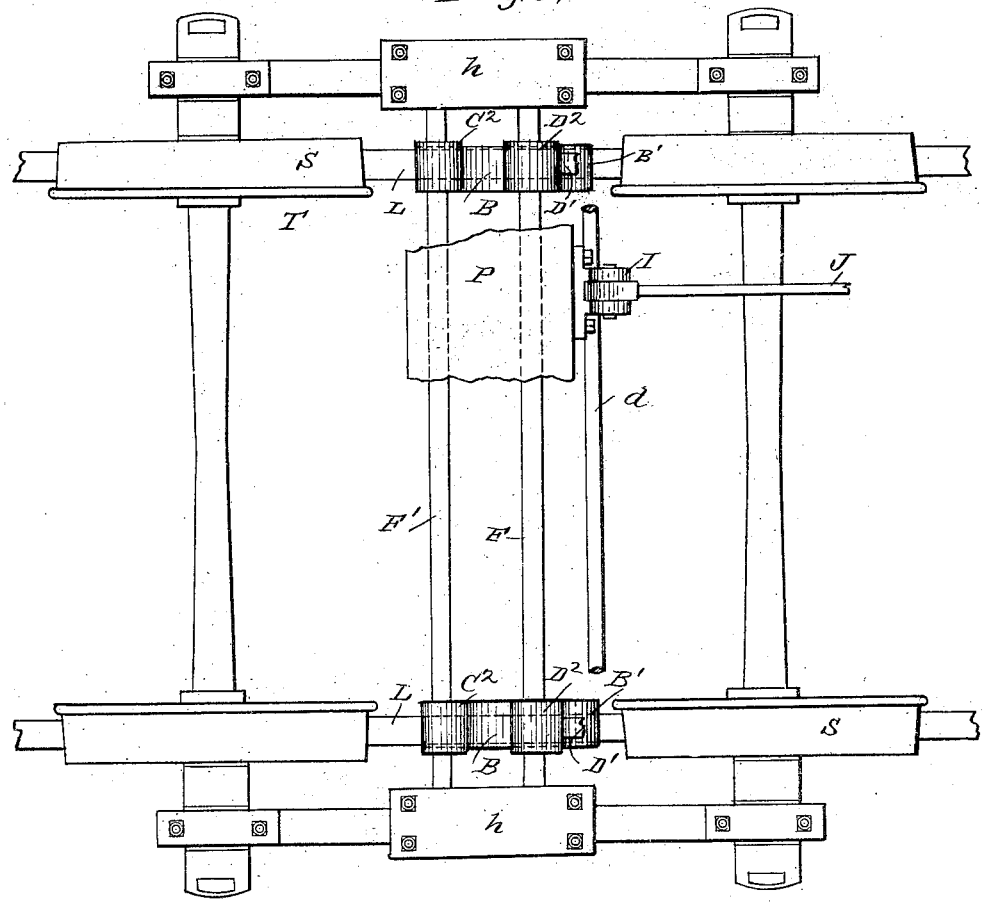

UNITED STATES PATENT OFFICE.

WILLIAM W. ALLEN, OF DULUTH, MINNESOTA.

TRACK-BRAKE.

No. 924,720.

Specification of Letters Patent.

Patented June 15, 1909.

Application filed December 5, 1908. Serial No. 466,141.

*To all whom it may concern:*

Be it known that I, WILLIAM W. ALLEN, a citizen of the United States, residing at Duluth, in the county of St. Louis and State of Minnesota, have invented certain new and useful Improvements in Track-Brakes, of which the following is a specification.

This invention relates to improvements in track brakes, but more especially that class of track brakes which are jointed and flexible in their connections, and which yield under excessive pressure without injury to the pivotal connections thereon.

This invention further relates to the independent pivotal connections of the brake shoes, whereby an elastic movement ensues when the brakes are applied independent of the pivotal connections on the truck beam, by this means an even pressure is maintained throughout the entire length of the shoes.

A further object of the invention is to make the brake shoes of sufficient length so that they will be effective when passing over a frog or switch rails, as it frequently happens that the brakes are applied close to a city where the switches are numerous, and short brake shoes would be liable to be caught in the frogs or switch rails thereof.

The majority of track brakes are rigid in their connections and any slight obstructions, such as the depression of the end of a rail at the fish plates, or on a switch would injure the mechanism thereon, and consequently the brakes would be useless.

With my improved track brake the flexible connections will yield in opposite directions sufficiently so as to prevent any injury to the parts assembled thereon, and at the same time be not liable to injure the car truck mechanism by excessive brake pressure, as the levers form semi-toggle joints and become vertical with the track when in braking operation, and any excessive pressure will throw the semi-toggles at an angle thereto, thus easing up the brake mechanism which will prevent accidents. The construction of the brake mechanism is such, that it becomes automatic in one direction when the brake shoes contact the rails.

With the foregoing and other objects in view, the invention consists in the details of construction and in the arrangement and combination of parts to be hereinafter more fully set forth and claimed.

In describing the invention in detail, reference will be had to the accompanying drawings forming part of this specification, wherein like characters denote corresponding parts in the several views, in which,—

Figure 1:
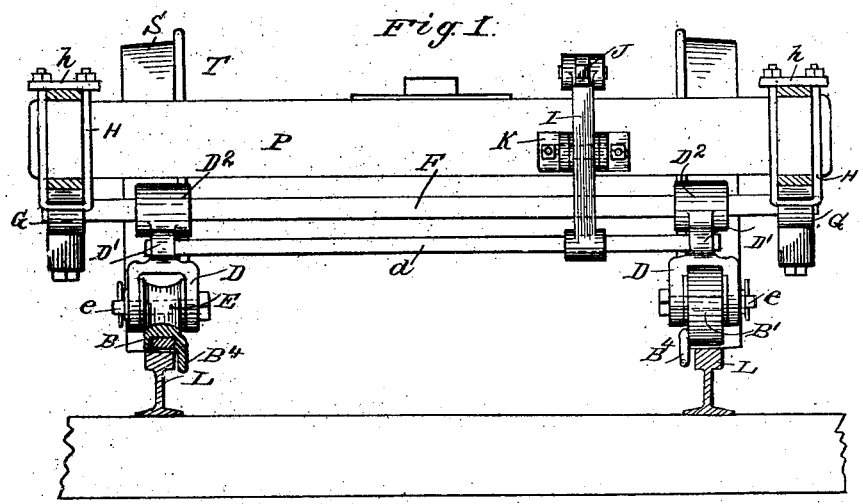
Figure 2:
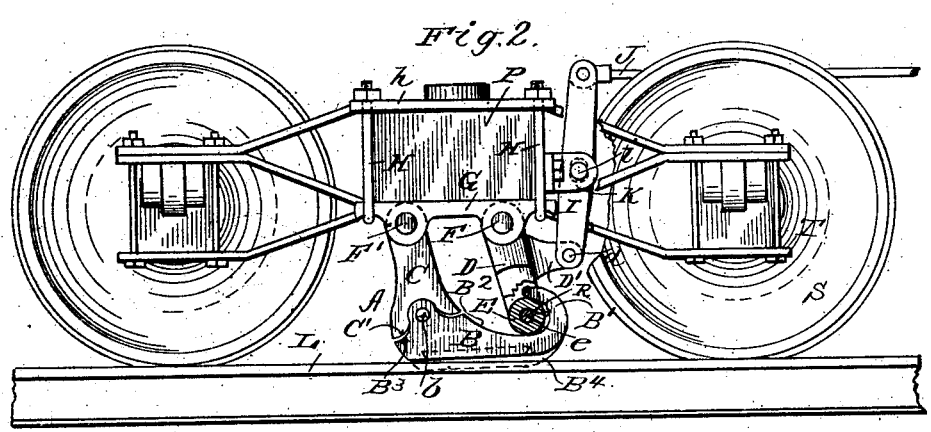

Figure 1 represents a truck in front elevation with my improved track brake thereon. Fig. 2 represents a side elevation of a truck with the track brake thereon, part of which is indicated in section. Fig. 3 represents a plan view of a truck with the brake and the operating mechanism thereon, with parts broken away. Fig. 4 represents the brake shoe in side elevation and partly in section exhibiting the wearing block. Fig. 5 represents the jointed link in side elevation for supporting the brake shoe. Fig. 6 represents the jointed link in an edge view. Fig. 7 represents the roller lever for operating the brake shoe in side elevation, partly broken away. Figs. 8 and 9, represent respectively, front elevation and section of the brake shoe and the jointed link thereon.

This improved track brake A, consists of a pivoted shoe B, which is connected to a jointed link C, by a pin $b$. One end of said shoe B, is rounded at B', in the form of a semicircle or hook for allowing a pivoted lever D, to operate a roller E, which is mounted on a pin $e$, secured to said lever D. Lever D, is provided with a projecting ear D', attached thereto, which is provided with a pin $d$, for securing it to the operating lever I. The lever D, and the pivoted link C, are mounted on short shafts, F and F', respectively engaging ears forming part of the plate G. The extreme ends of plate G, are concave so as to receive yokes H, H, for securing said plate G to the truck beam P, through the medium of the plate $h$, mounted on said truck beam.

The operating lever I, previously referred to is fulcrumed to a bifurcated plate K, which is bolted to the edge of the truck beam P. A pin $i$, supports said operating lever I, centrally of said lever, the free end of which is attached to a brake rod J, for operating the track brake A, when necessary.

The mechanism for operating the brakes can be of any desired construction, such as steam, air or purely mechanical means.

The truck beam P, is secured to a diamond frame, which is provided with boxes T, for supporting wheels S, on the track L.

The brake shoe B, is provided with a flange B⁴, to prevent the brake shoe from disengagement from the track L, and also from spreading laterally through the medium of the rod or shaft $d$, which operates the levers D, simultaneously when braking.

The jointed links C are provided with shoulders C', for engagement with the shoulders B³, on the brake shoe B. These shoulders do not contact each other except when in operation in which case the shoulders force the jointed link into operation when it assumes a vertical position relatively with the railway track L. The aforesaid brake shoe is curved on the upper surface B², whereby the roller E, can ride up said brake shoe and gradually force the shoe against the rail L, in combination with the lever or jointed link C. When necessary to release the brake shoe B, from contact with the rail L, the roller E, enters the inside portion R, of the hook B', and raises or releases it from the track L, and it is supported in this position until necessary to operate the brake again. The bottom of the brake shoe B, is provided with a wearing block which is dovetailed in said brake shoe and secured in the ordinary manner with a key.

The jointed links C, are provided with bosses C², to give greater stability and stiffness when operating the brake shoes, and also to prevent lateral movement of the parts connected therewith. The roller levers D, are also provided with heavy bosses D², so as to hold said levers in alinement with the brake shoes B.

It will be observed that the top portion of the brake shoes are convex, and the rollers contacting said brake shoes are concave on their periphery, consequently the two surfaces contacting will hold the brake shoes in alinement with the railway track and also with the car wheels thereon, and thus prevent lateral movement of the brake shoes and their connecting mechanism.

I do not limit myself to the exact construction as herein shown and described, as other pivotal devices can be employed in combination with my pivotal shoe, and come within the scope of the present invention.

That which I desire to claim and secure by Letters Patent, is—

1. A track brake shoe provided with pivotal connections thereon, in combination with hooked portions for releasing said track brake, as shown and described.

2. A track brake provided with pivotal levers, brake shoes attached to said pivotal levers, a hooked portion on said brake shoes, means for releasing said brake shoes from a railway track for the purpose in view.

3. A track brake provided with pivotal levers, brake shoes pivoted to said pivoted levers, a hooked portion on said brake shoes and the means for releasing said brake shoes through the medium of said hooked portion as specified.

4. A track brake provided with pivoted levers, brake shoes pivoted to said pivoted levers, a hooked portion on said brake shoes a roller lever for releasing said track brake as specified.

5. A brake mechanism provided with levers attached to a car truck, brake shoes pivotally attached to said levers, a hooked portion on said brake shoes and means for operating said brake shoes as specified.

6. A track brake provided with levers attached to a truck beam, brake shoes pivotally connected to levers on said truck beam, means for releasing said brake shoes through the medium of a hooked portion on said brake shoes as specified.

7. A track brake provided with levers attached to a plate, said plate attached to a truck beam, brake shoes pivotally connected to said levers, a hooked portion on said brake shoes and means for operating said brake shoes as herein shown and described.

8. A track brake provided with levers attached to a plate, brake shoes pivotally connected to said levers, roller levers for operating said brake shoes as specified.

9. A track brake attached to a truck beam, levers pivoted to said truck beam, brake shoes connected to said levers and in alinement with a railway track, a hooked portion on said brake shoes, and the means for elevating and lowering said brake shoes for the purpose as specified.

10. A track brake attached to a truck beam through the medium of levers pivotally connected therewith, brake shoes provided with flanges thereon pivotally connected to said levers of a roller lever for operating said brake shoes as specified.

11. A track brake consisting of levers pivotally secured to a truck, of brake shoes pivotally secured to said levers, a hooked or turned up portion on said brake shoes for engaging roller levers for the purpose as specified.

12. A track brake provided with levers pivotally attached to a plate, said plate secured to a truck beam, brake shoes pivoted to said levers, a roller lever provided with ears thereon for elevating and lowering said brake shoes for the purpose as shown and described.

13. A track brake provided with levers or jointed links, brake shoes pivoted to said levers or jointed links, roller levers engaging said brake shoes at the hooked portion thereof for operating the brake shoes as specified.

14. A track brake provided with jointed links or levers, brake shoes pivoted to said jointed links or levers, roller levers pivotally secured to a truck beam for operating said brake shoes through the medium of a turned up portion on said brake shoes as specified.

15. A track brake provided with jointed links, brake shoes pivoted to said jointed links, a hooked portion on said shoes, shoulders on said brake shoes and jointed links, means for operating said brake shoes.

16. A track brake having jointed links or levers attached thereto, said levers also attached to a truck beam, brake shoes provided with hooked portions, roller levers for engaging said hooked portions, an operating lever connected to said roller lever for the purpose as specified.

17. A track brake having jointed links or levers pivoted to a truck beam through the medium of a plate thereon, brake shoes pivoted to said jointed links or levers, a hooked portion on said brake shoes for receiving rollers therein pivoted to levers secured to the truck beam of a car truck, an operating lever pivoted to said truck beam engaging said roller levers.

18. A track brake provided with brake shoes having flanges thereon and a turned up or hooked portion, roller levers for engaging said hooked portion and operating said brake shoes, pivotal levers attached to a car truck engaging said brake shoes, and an operating lever attached to a shaft connecting with said roller levers for the purpose as specified.

19. A track brake attached to the truck beam of a car truck, through the medium of levers, brake shoes connected to said levers, shoulders on said levers and brake shoes, a hooked portion on said brake shoes for engaging roller levers attached to said truck beam, a shaft connecting said roller levers and an operating lever on said shaft for the purpose as specified.

In testimony whereof I affix my signature in presence of two witnesses.

WILLIAM W. ALLEN.

Witnesses:
H. HANSON,
S. VAN WAGNER.